(12) United States Patent
Hennessy

(10) Patent No.: US 11,562,130 B2
(45) Date of Patent: Jan. 24, 2023

(54) CLIENT-SIDE 2D RENDERING OF SERVER-SIDE MULTIDIMENSIONAL DATA

(71) Applicant: Oracle International Corporation, Redwood Shores, CA (US)

(72) Inventor: Robert James Hennessy, Pleasanton, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/163,098

(22) Filed: Jan. 29, 2021

(65) Prior Publication Data
US 2022/0245333 A1 Aug. 4, 2022

(51) Int. Cl.
| | |
|---|---|
| *G06F 40/18* | (2020.01) |
| *G06F 9/445* | (2018.01) |
| *H04L 67/01* | (2022.01) |
| *H04L 67/133* | (2022.01) |

(52) U.S. Cl.
CPC .......... *G06F 40/18* (2020.01); *G06F 9/44526* (2013.01); *H04L 67/01* (2022.05); *H04L 67/133* (2022.05)

(58) Field of Classification Search
CPC ........ G06F 40/18; G06F 9/44526; G06F 1/03; G06F 17/00; G06F 17/10; H04L 67/40; H04L 67/42; H04L 67/01; H04L 67/133

USPC .......................................... 715/214, 200, 212
See application file for complete search history.

(56) References Cited

U.S. PATENT DOCUMENTS

| | | | |
|---|---|---|---|
| 8,527,865 B2* | 9/2013 | Li | G06F 40/18 715/219 |
| 8,909,680 B1* | 12/2014 | Stolte | G06F 16/24552 707/810 |
| 9,081,830 B1* | 7/2015 | Stolte | G06F 16/248 |
| 9,390,082 B1* | 7/2016 | Stolte | G06F 16/2393 |
| 10,353,922 B1* | 7/2019 | Stolte | G06F 16/283 |
| 2007/0088691 A1* | 4/2007 | Dickerman | G06F 40/18 707/999.005 |
| 2007/0168323 A1* | 7/2007 | Dickerman | G06F 40/18 |
| 2019/0073366 A1* | 3/2019 | Ramaiyer | G06F 16/252 |

* cited by examiner

*Primary Examiner* — Manglesh M Patel
(74) *Attorney, Agent, or Firm* — Kilpatrick Townsend & Stockton LLP

(57) ABSTRACT

A multidimensional data cube at a server may store values and functions. The functions may use values stored in the data cube as inputs to generate results. A client application may retrieve values stored at a server in a multidimensional data cube to be updated and viewed locally at the client. Instead of evaluating functions at the server and transmitting the results to the client, the functions themselves may be translated into equivalent functions that can be evaluated in real time at the client. As inputs to the functions are a changed at the client, the function results can be updated at the client without requiring back-and-forth transmissions to the server or additional queries to the data cube.

17 Claims, 9 Drawing Sheets

CLIENT-SIDE 2D RENDERING OF SERVER-SIDE MULTIDIMENSIONAL DATA

BACKGROUND

Databases may be enabled to analyze multidimensional data interactively from multiple perspectives. A multidimensional databases may commonly be referred to as a multidimensional data "cube." Multidimensional cubes may be defined by dimensions that represent hierarchical groups of member data organized as cross-sectional groups that can be accessed by users for any of the hierarchical dimensions that are of interest. These dimensions may be hierarchical representations of business descriptors used in an organization. Queries to the database may select any point in the various dimensional hierarchy to retrieve a value at the intersection of those dimensions. Users may drill up, drill down, or pivot between dimensions to form new cross-sections and provide different perspectives for data analysis.

In modern cloud computing infrastructures, multidimensional data cubes may be maintained by a cloud service provider. Queries to the data cube may be executed at the server to retrieve values at the intersecting dimensions. Values retrieved from the data cube may then be transmitted to a client system where a client application may provide an interactive display for the retrieved values. Client applications may provide a two-dimensional display of data across various dimensions from the data cube. Users may provide updated values through the client application that can be transmitted to the server and used to update corresponding values in the multidimensional data cube.

In addition to providing access to values stored in the data cube, client applications may also retrieve the results of functions stored in the data cube. These functions may be executed using values queried from the data cube to generate results. The server may execute these functions and send the results to the client application for display. Updating these function results requires the client application to send updated values back to the server, where the new values can be updated and the function can be re-executed at the server. The new function results may then be transmitted back to the client application to update the display.

BRIEF SUMMARY

Instead of requiring functions to be reevaluated by the multidimensional data cube when the input values are changed by a client application, the embodiments described herein allow for client-side two-dimensional (2D) rendering of server-side multidimensional data, including real-time evaluation of functions. A multidimensional data cube at a server may store values and functions. The functions may use values stored in the data cube as inputs to generate results. A client application may retrieve values stored at a server in a multidimensional data cube to be updated and viewed locally at the client. Instead of evaluating functions at the server and transmitting the results to the client, the functions themselves may be translated into equivalent functions that can be evaluated in real time at the client. As inputs to the functions are a changed at the client, the function results can be updated at the client without requiring back-and-forth transmissions to the server or additional queries to the data cube.

For example, a location in the data cube may store a numerical value (e.g., "4.15"). A function may retrieve this numerical value from the data cube and perform a mathematical or processing operation on the value to generate a result. Functions may be used to generate average values, aggregated values, rolled-up values, value distributions, and/or any other mathematical or statistical function using the data in the data cube. When the client application requests numerical values for display, these values may simply be sent to the client application for display, and updates can be received through the client application and transmitted back to the server. However, formulas are typically evaluated at the server, and the results are then sent to the client application. For example, an average value for weekly numbers may be calculated at the server, and that average value may be sent to the application at the client system. If the numerical value is edited by a user at the client application, the result of the function transmitted to the client application may no longer be up-to-date. To update the function result at the client application, the updated numerical value is first transmitted back to the server where the corresponding location in the multidimensional data cube is updated with the updated numerical value. The function may then be re-evaluated at the server, and the new result may be transmitted back to the client application for display.

The embodiments described herein translate the function from the data cube into a function that can be executed locally at the client application. The data cube inputs used by the function may then be translated into cell addresses used by the client application. Value inputs for the function that are not updatable by the client application can be copied into the function at the client application. When the numerical value is updated at the client application, the function result displayed in the client application can be updated immediately by performing a local calculation at the client application. By translating the function such that it is executable at the client application and evaluating the function in real time, this effectively eliminates multiple queries to the data cube and reduces the number of transmissions back-and-forth between the client system and the server.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for providing client-side, two-dimensional (2D) rendering of server-side multidimensional data. A multidimensional data cube at a server may store values and functions. The functions may use values stored in the data cube as inputs to generate results. A client application may retrieve values stored at a server in a multidimensional data cube to be updated and viewed locally at the client. Instead of evaluating functions at the server and transmitting the results to the client, the functions themselves may be translated into equivalent functions that can be evaluated in real time at the client. As inputs to the functions are changed at the client, the function results may be updated at the client without requiring back-and-forth transmissions to the server or additional queries to the data cube.

Figure 1:
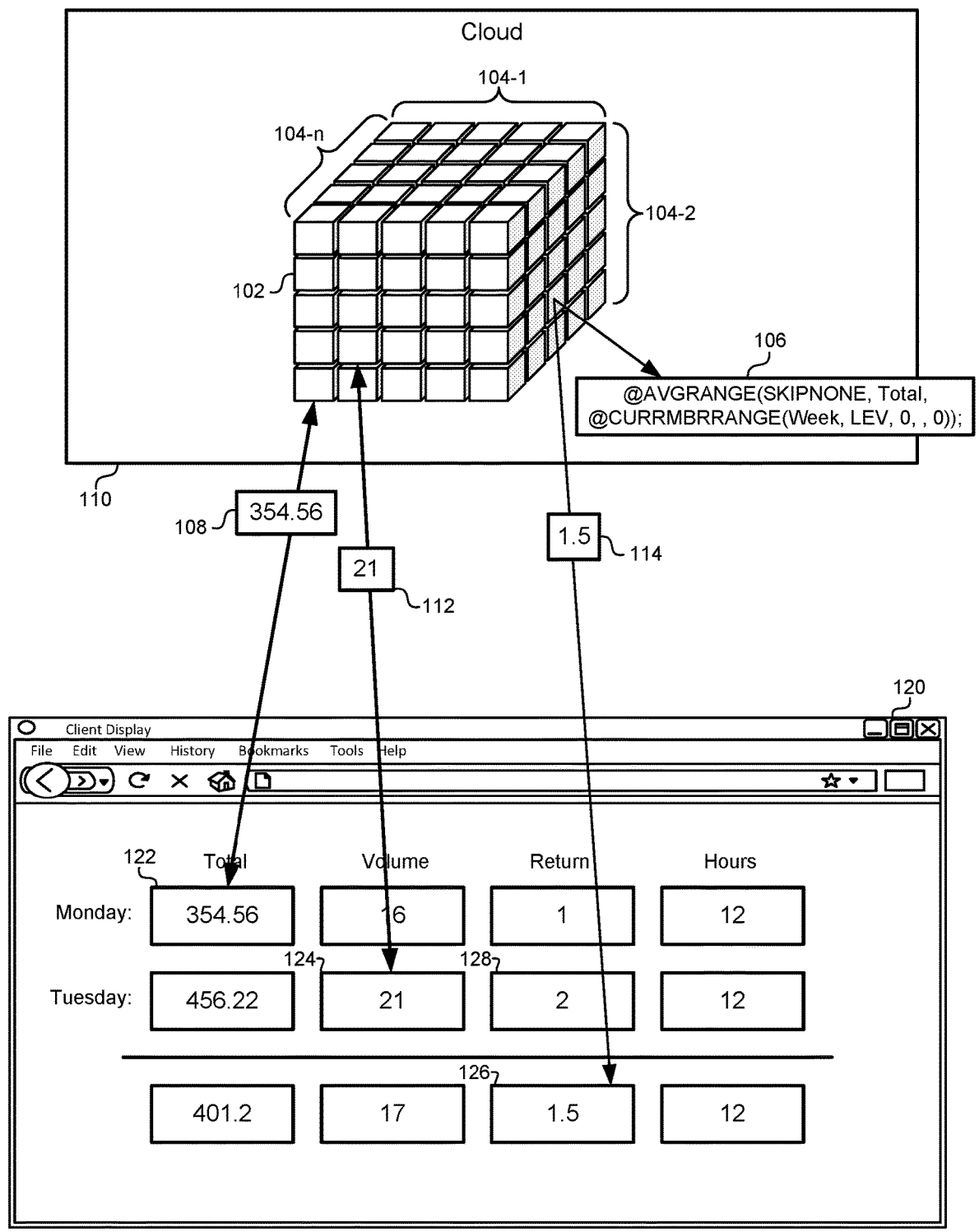
FIG. 1 illustrates a computing architecture with a server-based data cube that is accessible through a client-based application, according to some embodiments.

FIG. 1 illustrates a computing architecture with a server-based data cube that is accessible through a client-based application, according to some embodiments. The architecture may include a cloud computing system 110 that is made available by a cloud service provider. The cloud computing system 110 may provide hardware and/or software to tenants that subscribe to the cloud computing system 110 as described below in relation to FIG. 8. The cloud computing system 110 may provide different types of services, including Infrastructure as a Service (IaaS), Database as a Service (DBaaS), Platform as a Service (PaaS), Software as a Service (SaaS), and/or other "as a service" products offered by the cloud computing system 110.

One of the services offered by the cloud computing system 110 may include data storage and/or analytics. Data storage may include many different types of databases, disk arrays, redundancies, security regimes, and/or other features. In some embodiments, the cloud computing system 110 may provide a multidimensional data cube 102. The multidimensional data cube 102 may also be referred to herein as a "hypercube," a "data cube" or simply a "cube." The data cube 102 may implement a Cloud Online Analytical Processing (COLAP) database that allows users to analyze multidimensional data interactively from multiple perspectives. The data cube 102 may provide features such as consolidation (roll-up), drill-down, and/or slicing along different data dimensions. Thus, the data cube 102 may also be referred to as an OLAP cube or a COLAP cube.

Each dimension 104 in the data cube 102 may have a label or metadata associated with that dimension. These labels may correspond to business functions or other business terminology (e.g., time, date, sales, location, product type, etc.) that may be customized for each specific user or tenant of the cloud computing system 110. FIG. 1 illustrates the data cube 102 having at least three dimensions (e.g., dimensions 104-1, 104-2, . . . 104-n) by way of example. Data cubes in practice may have many more dimensions than can be clearly depicted in a figure, therefore the depiction of a three-dimensional cube in FIG. 1 is not meant to be limiting. Although the term "cube" traditionally refers to a three-dimensional object, the term "cube" in this area of technology is generally understood to include any number of dimensions greater than two dimensions.

Specific locations or groups of locations may be addressed in the data cube 102 by providing dimension values (e.g., a specific time, a specific location, etc.) and retrieving all values in the resulting vector space from the data cube 102. Instead of using traditional database queries, a data cube 102 may use multidimensional expressions that may be evaluated at the cube to return or calculate values. For example, the ESSBASE® database may use the MDX data manipulation language as a query language for multidimensional databases. More generally, formulas may be evaluated to return two-dimensional grids of information from the data cube 102.

Many different types of data may be stored in the data cube 102. For example, simple values may be stored at dimensional intersections in the data cube 102, such as numerical values, character strings, Boolean values, and other basic value types. As used herein, any data type stored in a location in the data cube 102 that does not rely on values stored in other locations to calculate their values may be referred to herein as "values." Values may be contrasted with "functions," which may retrieve values from other locations in the data cube 102 and perform calculations using those values to generate a result. An example of a function may include a function that calculates an average value for a plurality of values along a certain dimension in the data cube 102. In another example, a function may calculate an average number of items used per day during a particular week by retrieving a plurality of values from locations that store daily numbers of items used during that particular week. The function may retrieve these values and calculate an average value represented by a location in the data cube. Formulas may be used to calculate values, perform distributions, and/or perform other calculations involving data in the data cube 102.

Generally, functions use syntax and query languages that are specific to the data cube 102. These functions are typically executed at the server of the cloud computing system 110. For example, the query language may provide a function 106 such as @AVGRANGE that returns an average value of a specified member across a specified range in the data cube 102. The function may be evaluated at the data cube 102 to retrieve values along the specified range for the specified member and calculate an average value. The function syntax may be specific to the type of data cube 102 being used, and thus the function 106 may not be executable in other computing environments outside of the context of the data cube 102. Therefore, if a computing system outside of the context of the data cube 102 requests the result of the function 106, the function 106 may first be evaluated at the data cube 102, and the result of the function 106 may then be transmitted to the requesting system.

In some embodiments, client systems may run client applications to provide a client-side interface to the data cube 102. FIG. 1 illustrates an example of a client application 120 that may run on a client system. The client application 102 may be a browser-based application that displays a web form with values retrieved from the data cube 102. Alternatively, the client application 102 may include plug-ins for any data-viewing application, such as Microsoft Excel®. The client application 102 may operate on a different computing system that is remotely located away from the cloud computing system 110. For example, the data cube 102 may be hosted on a cloud platform, such as the Oracle Cloud Infrastructure, and the client application 120 may operate on a desktop or laptop computer at a customer's facility. Thus, the client system and the cloud computing system 110 may be owned and/or operated by different entities.

In order to display values from the data cube 102 at the client application 120, the client application may request data to be queried from the data cube 102. For example, the client application 120 may request value 122 that includes a simple numerical value (e.g., 354.56), as well as value 112 that includes another simple numerical value (e.g., 21). These values may be placed in a 2D display that is rendered locally at the client application 120. By way of example, this 2D display is represented as a grid in the client application 120 of FIG. 1. The grid may be organized into individual cells or other locations that may be associated with cell addresses. For example, a cell address may be represented by a combination of a numerical row identifier and an alphabetic column identifier (e.g., cell A3). Just as the queries to the specific dimensional intersections in the data cube 102 need not have meaning in the context of the client application 120, the cell addresses in the client application 120 need not have meaning in the context of the data cube 102. The row/column cell addresses described above are provided only by way of example. Any other type of identifier may be used as a cell address.

In order to populate the grid, the client application 120 may submit a request to the cloud computing system 110. Data cube 102 may then execute one or more queries to retrieve the value specified in the grid, such as value 108 and/or value 112. These values may then be transmitted to the client application 120 and used to populate cells in the grid. For example, a first value 108 from a first location in the data cube 102 may be used to populate a cell 122 in the client application 120. Similarly, another value 112 may be used to populate a cell 124 in the client application 120. These cells 122, 124 may be designated as input cells by the client application 120. This may allow a user or other client system to make changes or updates to the values in the cells 122, 124. Changes to the values displayed in these cells 122, 124 may be maintained locally at the client application 122. This allows the user to experiment with changes to these local values before being committed to the data cube 102. When a user elects to commit changes to these values, such as at the end of a computing session, the client application 120 may transmit the updated values back to the data cube 102. The data cube 102 may then execute routines/queries to store the updated values into the corresponding locations in the data cube 102.

When functions, such as function 106, are used by the client application 120, some embodiments transmit a result of the function 106 rather than transmitting the syntax of the function 106 itself. For example, the function 106 may be evaluated at the data cube 102 to calculate an average value for a one-week interval by retrieving daily totals from the data cube 102 and calculating an average total. The resulting average value 114 calculated by the function 106 may then be transmitted as a numerical value to the client application 120. The client application 120 may display the value 114 in a cell 126 that is designated as something other than an input cell. For example, the cell 126 may be designated as an output-only or read-only cell that prevents the user from making permanent changes to the value in the cell 126.

In order to update the result of the function 106 stored in the cell 126 at the client application, the function 106 may need to be reevaluated at the data cube 102. For example, one of the values used to calculate the result of the function 106 may be stored in cell 128 at the client application 120. If the user makes a change to the value stored in cell 128 (e.g., changing the 2 to a 3), the value in cell 126 may not be updated immediately. Instead, the client application 120 may transmit the updated value from cell 128 back to the data cube 102. The data cube 102 may then commit the changed value back to the corresponding location in the data cube 102. The data cube 102 may then evaluate the function 106 to generate a new result value for a corresponding location in the data cube 102. That result value may then be transmitted back to the client application 120 for display in the read-only cell 126. This process may require multiple back-and-forth transmissions between the client application 120 and the cloud computing system 110, which decreases the available network bandwidth at both computing systems. This process may also require multiple queries to be evaluated at the data cube 102, which may increase the load on the data cube 102 and may decrease its availability and responsiveness. Furthermore, the results may not be available in real time at the client application 120, as the user needs to wait until an updated value can be received from the data cube 102 for cell 126. Users may also need to commit values entered in at the client application 122 the data cube 102 before the function results can be displayed. Rolling back committed data is a difficult process that should be avoided, and thus users may be left with no way to see the effects of changing values at the client application 120 without committing data to the data cube 102.

The embodiments described herein solve these and other technical problems to improve the functioning of the client application 120, the cloud computing system 110, and/or the data cube 102. Specifically, as described below, these embodiments translate a version of the function 102 that may be evaluated at the client application 120. This allows the client application 120 to display results of the function in the cell 126 in real time without an appreciable delay for the user. As the user enters new values into cell 128, these values may be immediately evaluated by the function to update the value in cell 126. This improves the functioning of the computing systems by eliminating the back-and-forth transmissions between the client application 120 and the data cube 102 each time values are changed that are used as inputs to the function 106. This also provides a more responsive client application 120 as results can be displayed in real-time. This also improves the functioning of the data cube 102 by reducing the number of queries or transactions that need to be evaluated at the data cube 102. Instead of committing values after every change of the client application, final values may be committed at the end of the computing session from the client application 120. This reduces the number of rollbacks that may need to be performed at the data cube 102, and improves the availability of the data cube 102.

Figure 2:
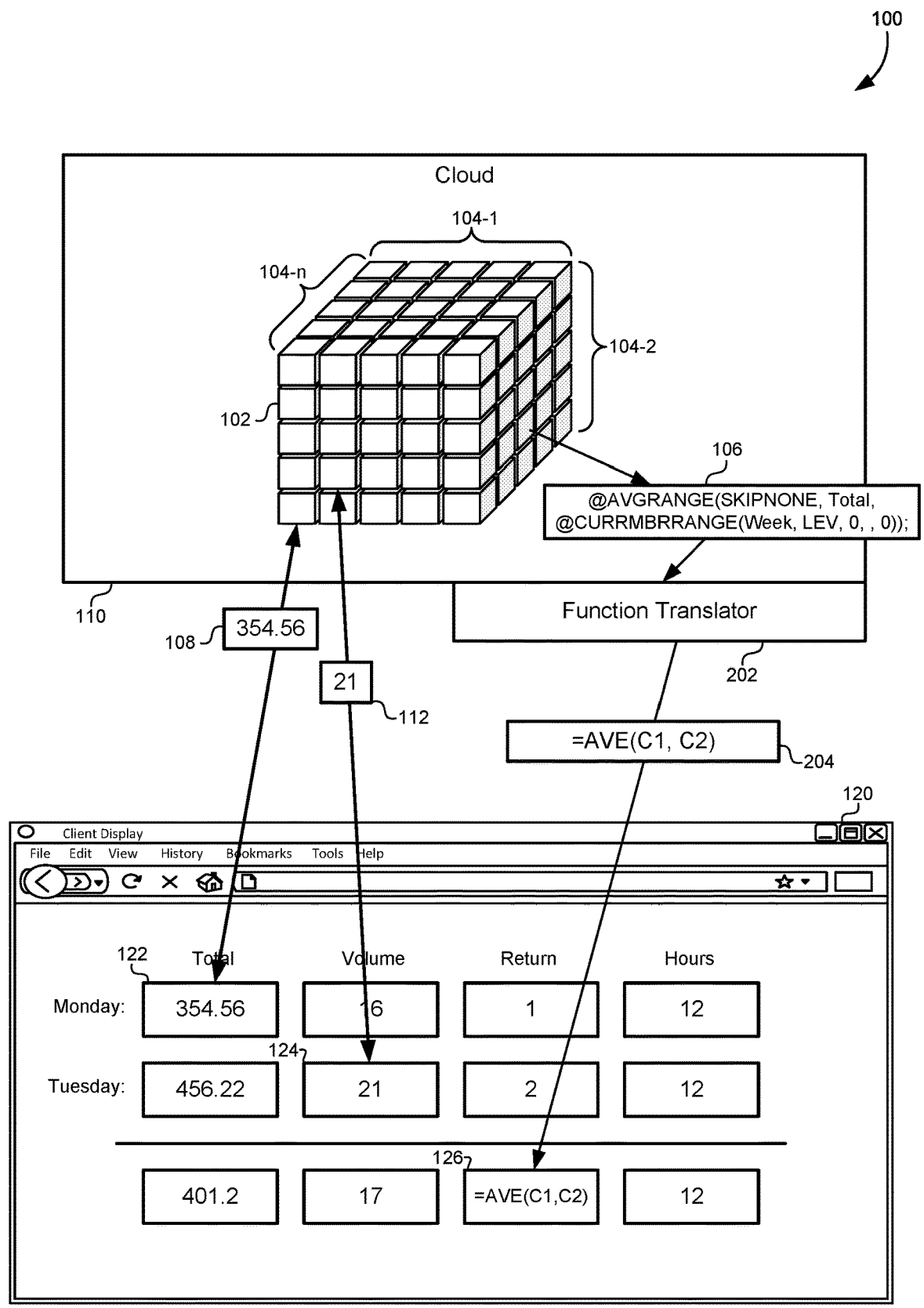
FIG. 2 illustrates a computing architecture that translates functions in the data cube domain into new functions that can be evaluated in the client application, according to some embodiments.

FIG. 2 illustrates a computing architecture that translates functions in the data cube domain into new functions that can be evaluated in the client application, according to some embodiments. The cloud computing system 110 may include a function translator 202 that receives the function 106. For example, when a request is made by the client application 120 to display a result of the function 106, the function 106 may be passed to the function translator 202 instead of evaluating the function 106 and sending the resulting value to the client application 120. The function translator 202 may be configured to translate the function 106 from syntax that is executable on the data cube 102 into syntax that is executable by the client application 120. The input function to the function translator 202 may be generically referred to as a "first function," while the output function from the function translator 202 may generically be referred to as a "second function." The terms first/second are used only to distinguish one function from another function. These terms are not meant to imply order, precedence, importance, or any other distinguishing feature.

To translate the function 106 into syntax that is executable by the client application 120, some embodiments may use a data structure that stores mappings between functions that are executable on the data cube 102 and functions that are executable by the client application 120. This data structure, such as a lookup table, a hash table, an index, a key-value store, and/or any other type of data structure, may store syntax such as function names and parameter lists that are executable by the client application 120. The data structure may be indexed using the function names and/or parameter lists from the data cube 102 to return corresponding function names and parameter lists that are executable in the client application 120. For example, the @AVGRANGE( ) function name may be submitted to the data structure to retrieve the corresponding AVE( ) function name from the data structure. Overloaded functions with multiple parameter lists may also be further matched by matching the parameter lists.

In some embodiments, determining a corresponding function name at the client application 120 may be done automatically. For example, the cloud computing system 110 may retrieve a list of function names from the client application 120. The list of function names may then be matched to corresponding function names at the data cube 102. For example, fuzzy string matching algorithms may be used to find function names that are substantially similar or within a threshold distance of the input function names. Alternatively or additionally, metadata or comments in function specifications may be used to identify matching function names. For example, metadata tags may be used to indicate compatibility with function names in other languages or another computing platforms. The cloud computing system 110 and/or the client application 120 may parse the metadata for functions executable at the data cube 102 and/or at the client application 120 to identify compatible functions between the two. This process may then populate the data structure using matches as they are identified. Some embodiments may also allow an administrator to review the mapping between function names and make adjustments as needed.

As described above, the function 106 may include references to other locations in the data cube 102 for values that are used by the calculations performed by the function 106. A reference to a location in the data cube may include a dimension or set of dimensions that are retrieved by the function 106. The reference may include a name or other identifier for a specific location in the data cube 102. The reference may also include another function that retrieves specified values from the data cube 102. As used herein, a reference to a location in the data cube 102 may include any syntax that may be used to retrieve a value from that location in the data cube 102. The value retrieved from a location in the data cube may be used as a parameter in the function 106 or as any other input element to the function 106.

In addition to translating the first function from the data cube 102 into a second function for the client application 120, some embodiments may also translate references to locations in the data cube 102 into cell addresses for the corresponding cells holding values in the client application 120. In some cases, values that are displayed and/or editable at the client application 120 may also be used as parameters or inputs to the function 204. At the data cube 102, the function 106 would retrieve or calculate those values from the data cube 102 before evaluating the function 106. At the client application 120, the syntax of the function 204 may be changed to reference the cells in the client application 120 instead of querying the locations in the data cube 102.

The function translator 202 may identify cells addresses where the values for the parameters of the function 204 are located in the client application 120. The client application 120 may communicate with the cloud computing system 110 to associate values in the data cube 102 with corresponding cell addresses in the client application 120. For example, the value 112 from a particular memory location in the data cube 102 may be associated with cell 124 having a particular cell address (e.g., "B2"). The function translator 202 may then determine whether any parameters in the function 204 also reference this same memory location in the data cube 102. If any such references are found, they may be replaced with the cell address for the corresponding value in the client application 120.

Figure 3:
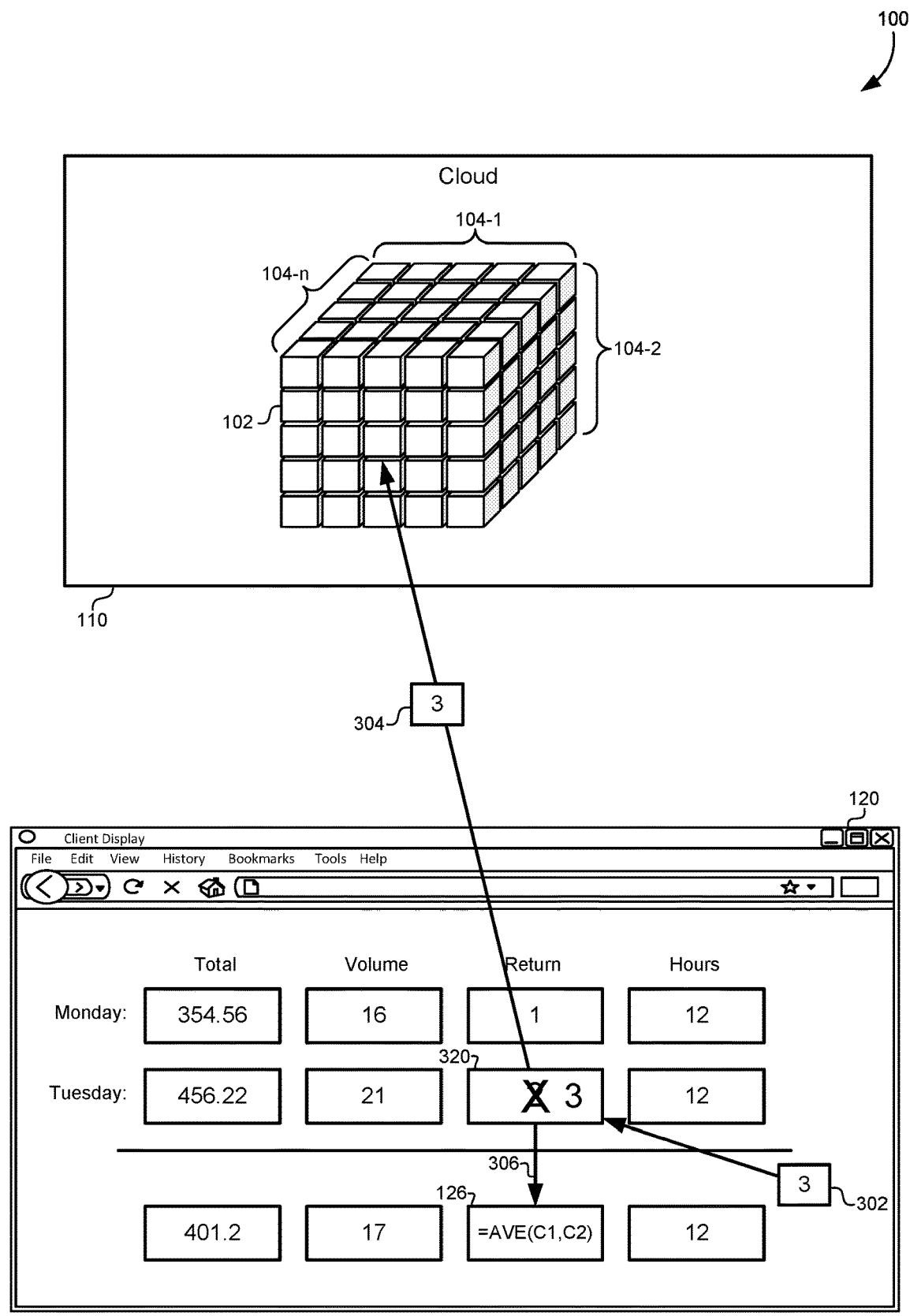
FIG. 3 illustrates how the translated references to cell addresses in the client application allow functions to be evaluated in real time locally at the client application to reflect immediate changes in the input values, according to some embodiments.

FIG. 3 illustrates how the translated references to cell addresses in the client application allow functions to be evaluated in real time locally at the client application to reflect immediate changes in the input values, according to some embodiments. In this example, the function in cell 126 may reference a value in cell 320 of the client application 120. As described above, the function syntax may be translated such that a previous reference to a memory location in the data cube 102 has been replaced with a reference to a cell address for cell 320.

As described above, the client application 120 may be configured to allow real-time, interactive manipulation of values in the input cells. Cell 320 may be defined as an input cell, as it is populated with a stand-alone value rather than a value that depends on other cell values, such as a function. Thus, the value in cell 320 may be changed by virtue of a user input from "2" to "3." This new value 304 may be transmitted back to the data cube 102 to be committed to the data cube. However, this operation need not take place immediately when the value is changed in the cell 320. Instead, the client application 120 may update other cell values that are dependent on the cell 320 and allow the user to see the effects of this change on other dependent cells. This allows the user to test various values before committing any changes back to the data cube 120.

In this example, the function in cell 126 may be reevaluated when the value in cell 320 is changed. Instead of committing the value 304 to the data cube 102, querying that value, reevaluating the function, and returning that value to the function, the function in cell 126 may instead receive the value from cell 320 within the client application 120. This allows immediate updates to values and other changes to be propagated to functions and calculated/managed entirely within the client application 120 without need to commit data to or acquire new data from the data cube 102.

Figure 4:
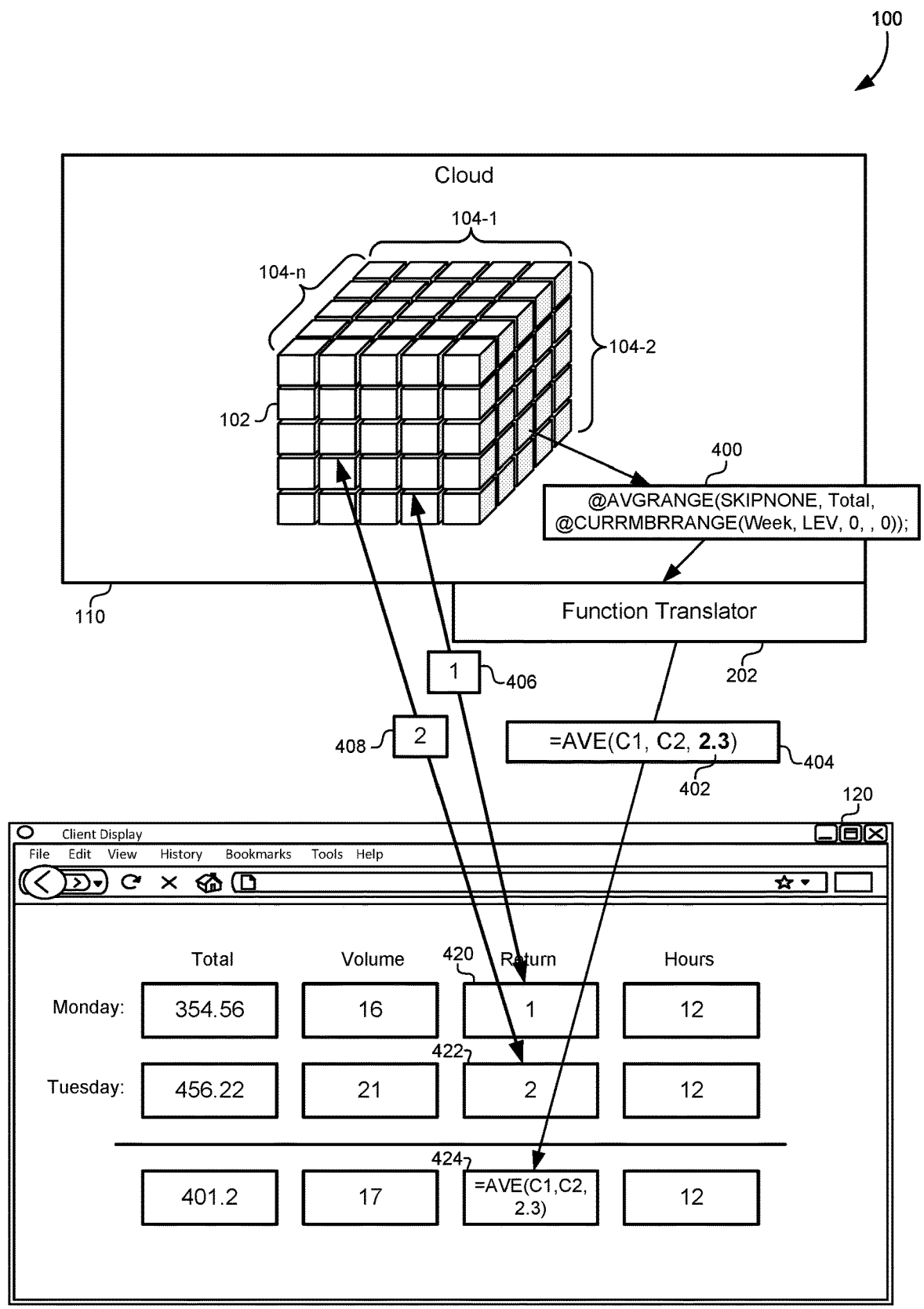
FIG. 4 illustrates how values can be hardcoded into the second function sent to the client application when those values are not available in the client application, according to some embodiments.

FIG. 4 illustrates how values can be hardcoded into the second function sent to the client application when those values are not available in the client application, according to some embodiments. If a first function 400 includes references to other values stored in locations in the data cube 102 and/or calculated based on values from the data cube 102, these values may be retrieved and copied into corresponding parameter locations in the function 404 that is executable at the client application 120. In other words, these values can be retrieved and hard-coded into the syntax for the function 204 when the function 204 is sent to the client application 120. This allows the client application 120 to evaluate the function 204 in real time without requiring additional queries to the data cube 102 to retrieve these values. Values may be hard-coded into the syntax of the function 204 when they are not also displayed or otherwise available in the client application 120. This allows the client application 120 to handle values that are immediately available at the client application 120, as well as values that are only available at the data cube 102.

For example, the function 400 may include a reference to a value 402 that is stored in the data cube 102, but which is not displayed by the client application 120. Because of the relatively large amount of data stored in the data cube 102, the client application 120 may retrieve only a small subset of the data stored in the data cube 102. This may leave many values in the data cube 102 that are not accessible to the client application 120 during the current computing session without making additional queries to the data cube 102. To make a value available to the function 404 in the client application 120, the value 402 may be hard-coded into the syntax of the function 404.

The value 402 may be stored as part of the function 404 in a cell 424. However, other parameters or inputs to the function 424 may instead use references to cell addresses in the client application 120 as described above. This allows the client application 120 to simultaneously use static values that are not available in the client application 120 along with values that are dynamically changed in the client application 120 to evaluate functions in real time.

Figure 5:
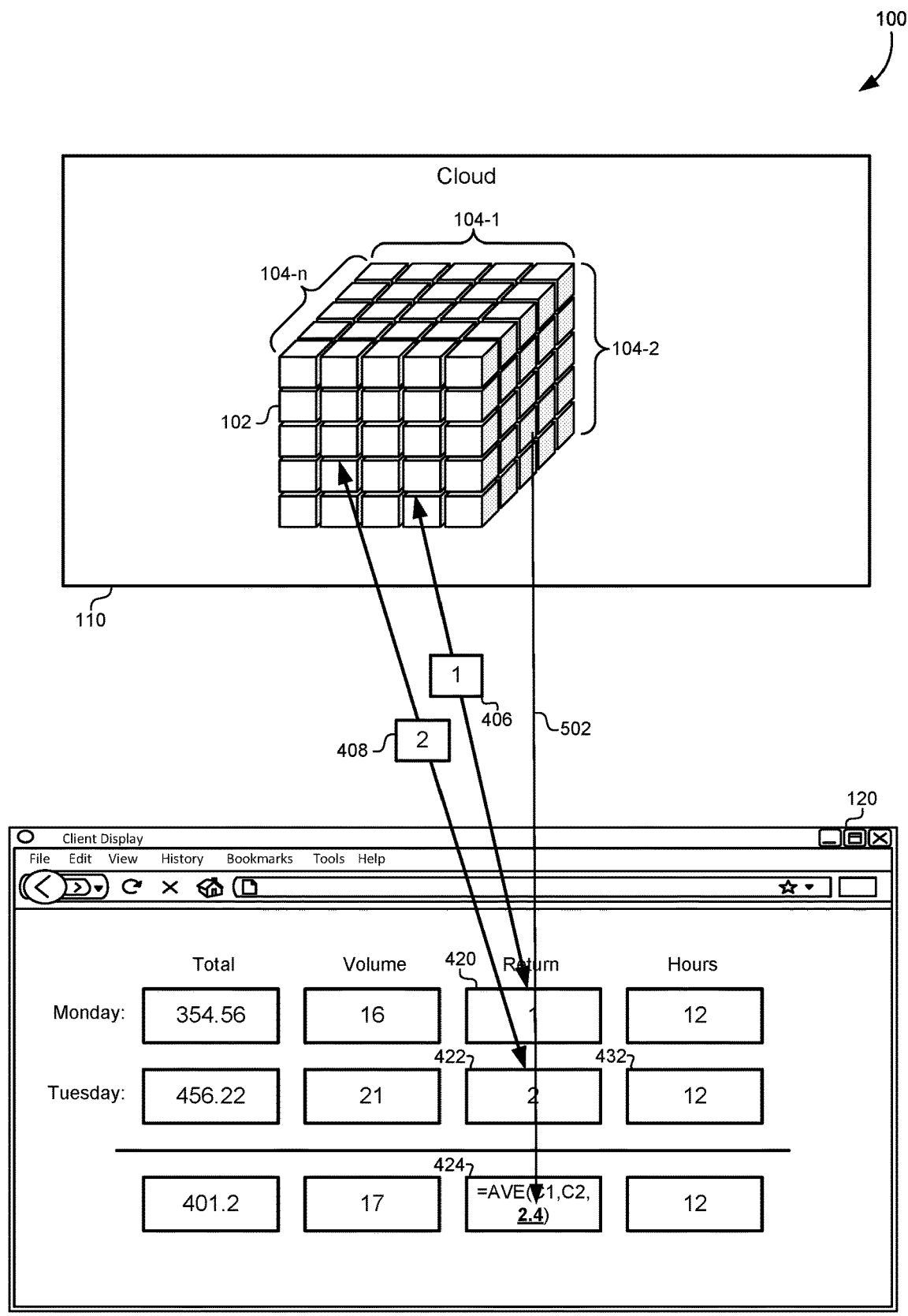
FIG. 5 illustrates how data may be committed back to the data cube and/or updated from the data cube as needed, according to some embodiments.

FIG. 5 illustrates how data may be committed back to the data cube 102 and/or updated from the data cube 102 as needed, according to some embodiments. As described above, changes to the values stored in cells in the client application 120 need not result in an immediate update or committing of data to the data cube 102. Instead, a user may be allowed to experiment with different values and see their calculated results locally in the client application 120 before data is committed back to the data cube 102. For example, a user may be provided with a control that allows an input to be received that indicates that changes made to values displayed in the client application 120 should be committed back to the data cube 102. In another example, a user may indicate that they are done with the current computing session by, for example, closing the client application 120 or saving data in the client application 120. These inputs may generate an indication to the cloud computing system 110 that the client application 102 has received changes for values in the data cube 102. These new values, such as values 406, 408 in cells 420, 422 may be transmitted back to the cloud computing system 110 to be committed to the data cube 102. These values 406, 408 may be stored back to locations in the data cube 102 from which they were originally retrieved when the cells in the client application 120 were populated.

In some embodiments, users may be allowed to change the function syntax, parameters, and/or references in function cells in the client application 120. For example, the user may be granted administrative privileges to select a different function and replace the current function called in the cell 424. Alternatively or additionally, the user may change parameters to reference different cells in the client application 120. For example, instead of referencing cell 422, the syntax of the function in cell 424 may be changed to instead reference cell 432 by changing the cell address. When the data is committed in the client application 120, the new syntax for the function in cell 424 may be sent back to the cloud computing system 110. The same function translator described above may perform an inverse process that translates the function syntax and the cell references back into function syntax that is compatible with the data cube 102 and references to locations in the data cube 102 rather than cell addresses in the client application 120. For example, the opposite process described above in relation to FIG. 4 may be carried out to perform this reverse translation.

In addition to committing data from the client application 120, some embodiments may periodically refresh hard-coded values in the function syntax at the client application 120. As described above, a value may be hard-coded into the function syntax when that value is not available as a cell reference in the client application 120. However, it is possible that the value at the corresponding location in the data cube 102 may be updated after that value is hardcoded into the function syntax and sent to the client application 120. In order to provide up-to-date information, the hard-coded values in functions at the client application 120 may be periodically updated with values queried from the data cube 102. For example, these values may be refreshed periodically, such as every five minutes, every 15 minutes, every 20 minutes, every 30 minutes, and so forth. In another example, these values may be refreshed when triggered by events at the client application 120 or by events at the data cube 102. When the data cube receives a new value for a memory location that was previously hardcoded into a function at the client application 120, the data cube 102 may push the new value out to the client application 120 to be updated in the corresponding function syntax. Alternatively or additionally, the client application 120 may request refreshed values when a predetermined number of changes to the data have occurred in the client application 120. This allows the data to be refreshed when a large number of changes have been made at the client application 120. The client application 120 may also request refreshed values when an indication is generated that the changes in the client application 120 should be committed. For example, a value 502 may be refreshed from the data cube 102 when a user indicates they are ready to commit the data changes. The client application 120 may notify the user that a refresh is taking place and update the values, function evaluations, and displays in the client application 120 accordingly. This allows the user to see the data changes as accurately as possible before committing the changes.

Continuing with the terminology described above, a value stored at the data cube 102 that is not available at the client application 120, and which is consequently hard-coded into the function syntax at the client application 120 may be referred to as a second value at "third" memory location. The terms "second/third" are used merely to distinguish these values in memory locations from other values and/or memory locations described herein.

Figure 6:
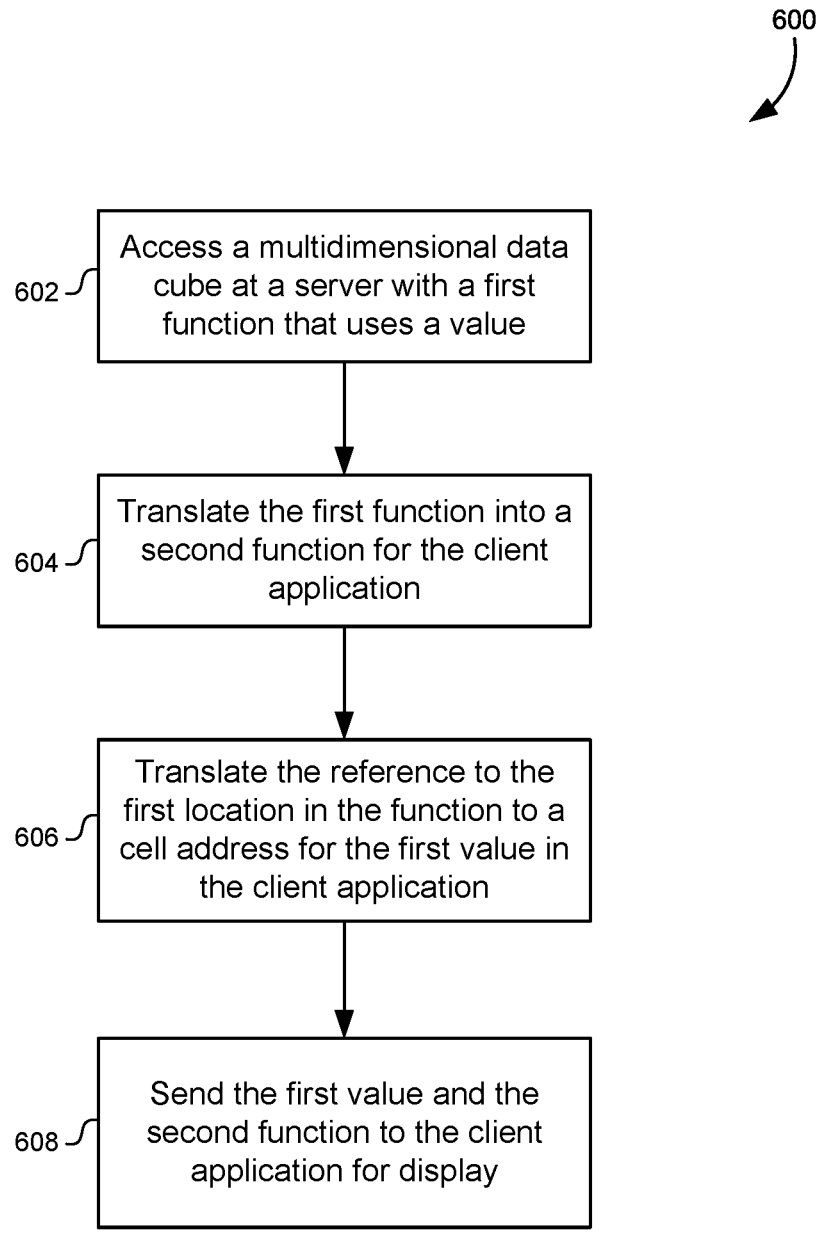
FIG. 6 illustrates a flowchart of a method for enabling real-time, client-side rendering of server-side multidimensional data, according to some embodiments.

FIG. 6 illustrates a flowchart 600 of a method for enabling real-time, client-side rendering of server-side multidimensional data, according to some embodiments. This method may be carried out at a server, and the server may be located at a cloud-computing system, such as the cloud-computing system 110 described above. The server may be provided by a cloud service provider, while the client system may be owned/operated by a customer or tenant of the cloud service provider. These systems may be separated logically, may use different computing hardware and/or software, may be owned and operated by different entities, and may be physically separated by large distances (e.g. greater than 1 mile) from each other.

The method may include accessing a multidimensional data cube at a server (602). The data cube may include a first location that stores a first value, such as a numerical value, string value, or any other data type. The data cube may also include a second location of stores a first function. The first function may include a reference to the first location as an input to the first function. For example, the first value may be used as a parameter or input for the function. In some instances, the function may also include a reference to a third location that stores a second value that is used as a parameter or input for the function. The data cube may be accessed as described above in FIGS. 1-2 and throughout this disclosure.

The method may also include translating the first function into a second function (604). The first function may be stored at the data cube and may be executable on the data cube at the server. In contrast, the second function may be executable by a client application at a client system. The function may be translated by selecting a function name from a library of functions available at the client application that performs a similar function to the first function at the data cube. A data structure may be used to associate functions at the data cube that are compatible with functions at the client application. Function translation may be carried out as described above in FIG. 2 and throughout this disclosure.

The method may further include translating the reference to the first location into a cell address for the first value in the client application for the second function (606). Translating the reference into a cell address may include identifying the cell address in the client application for a cell in which the first value is displayed by the client application. The method may then replace the reference to the first location in the second function with the cell address. The cell address may be allowed to be updated and viewed through the client application, whereas a cell in which the second function is stored need not be allowed to be updated through the client application in some instances. Translating references into cell addresses may be carried out as described above in FIGS. 2-3 and throughout this disclosure. Some references may be replaced with hard-coded values when those values are not displayed and updated through the client application as described above in FIGS. 4-5 and throughout this disclosure.

The method may also include sending the first value and the second value to the client application (608). The client application may include a browser, an app, a plug-in for a spreadsheet application, and so forth. For example, the client application may include a web form that displays current values from the data cube and receives inputs to update those current values.

It should be appreciated that the specific steps illustrated in FIG. 6 provide particular methods of enabling real-time, client-side rendering of server-side multidimensional data according to various embodiments. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 7:
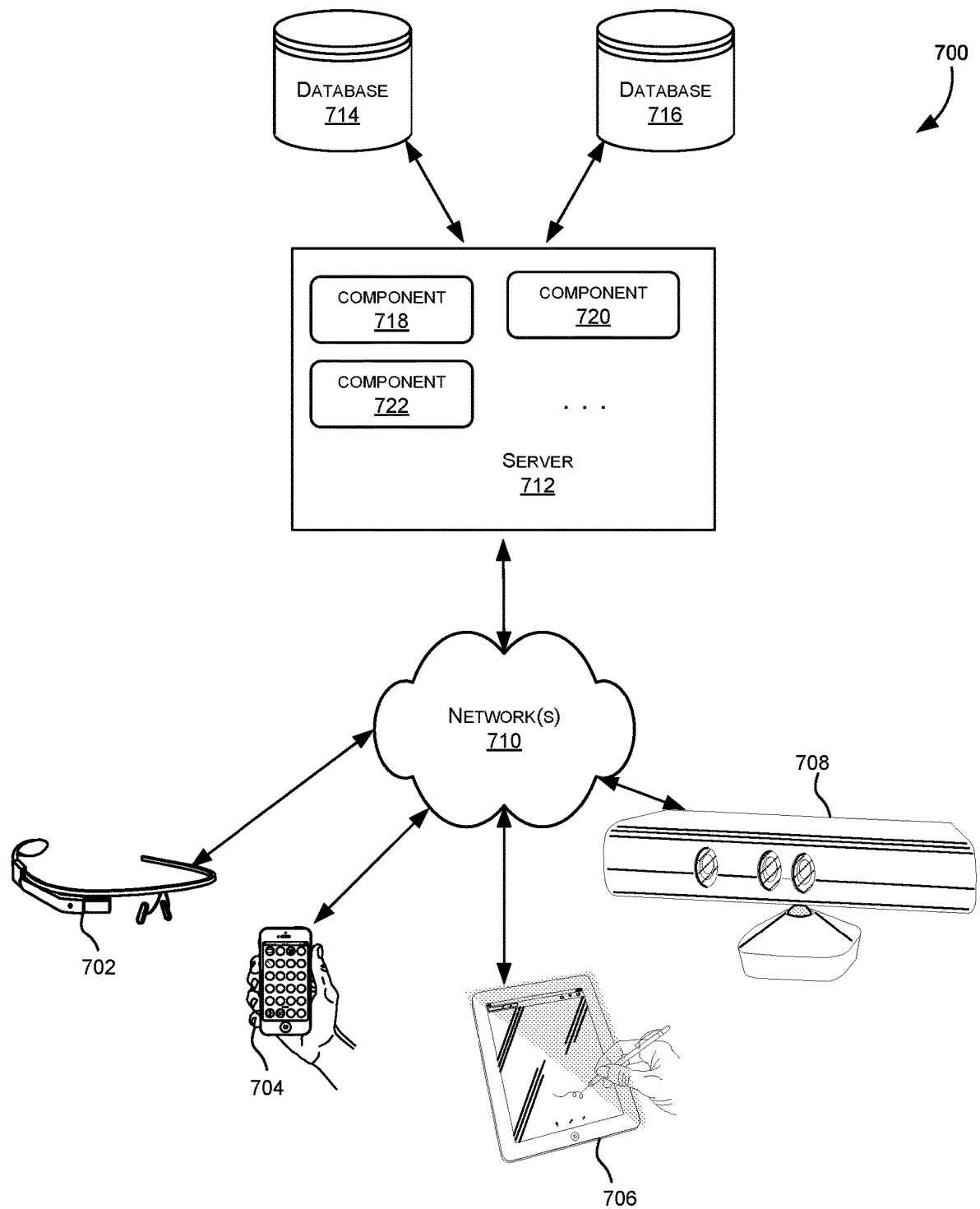
FIG. 7 illustrates a simplified block diagram of a distributed system for implementing some of the embodiments.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
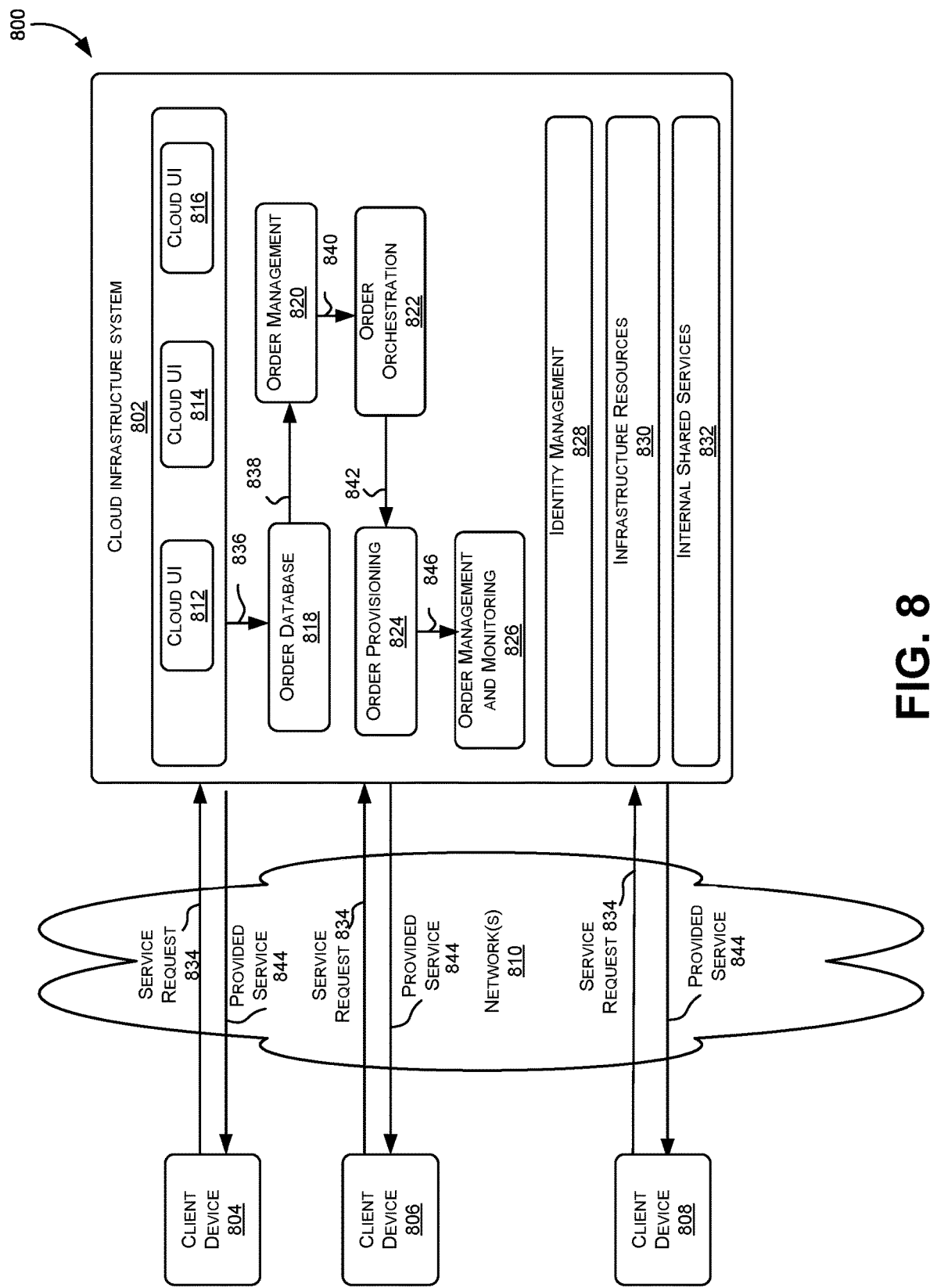
FIG. 8 illustrates a simplified block diagram of components of a system environment by which services provided by the components of an embodiment system may be offered as cloud services.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the system shown in the figure is only one example of a cloud infrastructure system that may incorporate some embodiments. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network that can support data communications using any of a variety of commercially-available protocols, including those described above for network(s) 710.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
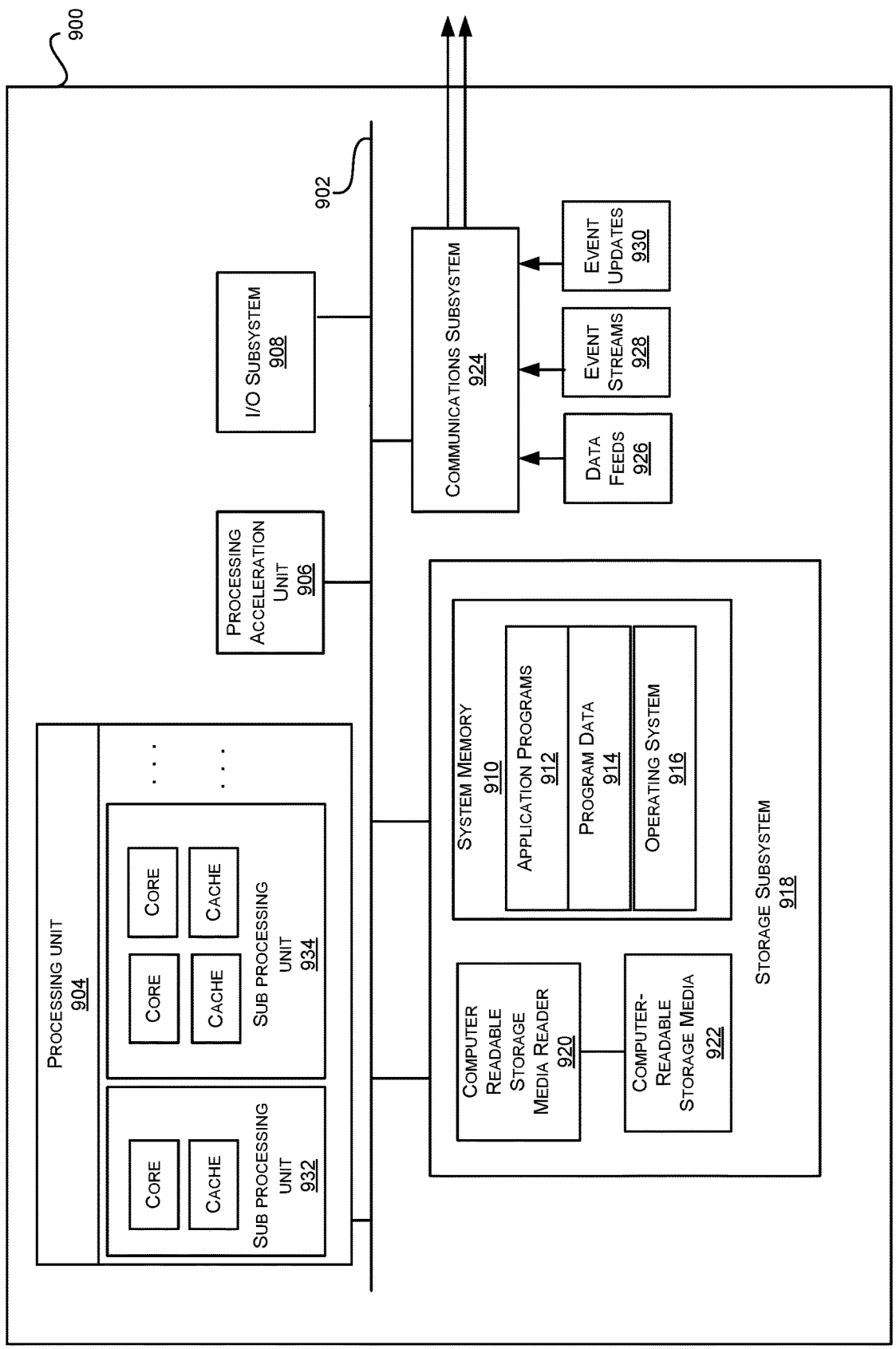
FIG. 9 illustrates an exemplary computer system, in which various embodiments may be implemented.

FIG. 9 illustrates an exemplary computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with some embodiments.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
   accessing a multidimensional data cube at a server, wherein the multidimensional data cube comprises:
      a first location that stores a first value;
      a second location that stores a first function; and
      a third location that stores a second value, wherein the first function comprises references to the first location and the third location;
   translating the first function into a second function, wherein:
      the first function is executable on the multidimensional data cube at the server; and
      the second function is executable by a client application at a client system;
   translating the reference to the first location into a cell address for the first value in the client application for the second function;
   inserting the second value into the second function;
   sending the first value and the second function to the client application;
   determining that the second value has changed at the server; and
   sending an updated second value to the client application to be inserted in the second function such that a result of the second function is updated in the client application.

2. The non-transitory computer-readable medium of claim 1, wherein the operations further comprise:
   causing the first value and a result of the second function to be displayed in a form on a display device of the client system.

3. The non-transitory computer-readable medium of claim 1, wherein the operations further comprise:
   receiving an indication that the client application has received a change for the first value; and
   causing the change for the first value to be stored in the first location.

4. The non-transitory computer-readable medium of claim 1, wherein the client application updates a result of the second function that is calculated locally at the client system when the first value is changed locally at the client system.

5. The non-transitory computer-readable medium of claim 4, wherein updating the result of the second function at the client system does not require the first function to be executed at the server.

6. The non-transitory computer-readable medium of claim 1, wherein the second value is inserted into the second function instead of translating the reference to the third location into a cell address in the client application.

7. The non-transitory computer-readable medium of claim 6, wherein the client application does not require the second value to be displayed with the first value and a result of the second function.

8. The non-transitory computer-readable medium of claim 1, wherein the operations further comprise:
receiving a request from the client application that to commit to the multidimensional data cube changes made to values at the client application; and
sending a current value for the second value to the client application to be inserted into the second function, wherein the client application recalculates a result of the second function based on the current value for the second value.

9. The non-transitory computer-readable medium of claim 1, wherein translating the first function into the second function comprises:
accessing a data structure that stores mappings between functions that are executable on the multidimensional data cube and functions that are executable by the client application; and
providing the first function as an input to the data structure and receiving the second function as an output from the data structure.

10. The non-transitory computer-readable medium of claim 1, wherein the first value comprises a numerical value.

11. The non-transitory computer-readable medium of claim 1, wherein the client application comprises a plug-in for a spreadsheet application at the client system.

12. The non-transitory computer-readable medium of claim 1, wherein the client application comprises a web form that displays current values from the multidimensional data cube and receives inputs to update the current values in the multidimensional data cube.

13. The non-transitory computer-readable medium of claim 1, wherein translating the reference to the first location into the cell address for the first value in the client application comprises:
identifying the cell address in the client application for a cell in which the first value is displayed by the client application; and
replacing the reference to the first location in the second function with the cell address.

14. The non-transitory computer-readable medium of claim 1, wherein:
a first cell in the client application in which the first value is stored is allowed to be updated through the client application; and
a second cell in the client application in which the second function is stored is not allowed to be updated through the client application.

15. The non-transitory computer-readable medium of claim 1, wherein the server is part of a cloud service provider.

16. A method of enabling real-time, client-side rendering of server-side multidimensional data, the method comprising:
accessing a multidimensional data cube at a server, wherein the multidimensional data cube comprises:
a first location that stores a first value;
a second location that stores a first function; and
a third location that stores a second value, wherein the first function comprises references to the first location and the third location;
translating the first function into a second function, wherein:
the first function is executable on the multidimensional data cube at the server; and
the second function is executable by a client application at a client system;
translating the reference to the first location into a cell address for the first value in the client application for the second function;
inserting the second value into the second function;
sending the first value and the second function to the client application;
determining that the second value has changed at the server; and
sending an updated second value to the client application to be inserted in the second function such that a result of the second function is updated in the client application.

17. A system comprising:
one or more processors; and
one or more memory devices comprising instructions that, when executed by the one or more processors, cause the one or more processors to perform operations comprising:
accessing a multidimensional data cube at a server, wherein the multidimensional data cube comprises:
a first location that stores a first value;
a second location that stores a first function; and
a third location that stores a second value, wherein the first function comprises references to the first location and the third location;
translating the first function into a second function, wherein:
the first function is executable on the multidimensional data cube at the server; and
the second function is executable by a client application at a client system;
translating the reference to the first location into a cell address for the first value in the client application for the second function;
inserting the second value into the second function;
sending the first value and the second function to the client application;
determining that the second value has changed at the server; and
sending an updated second value to the client application to be inserted in the second function such that a result of the second function is updated in the client application.

* * * * *